United States Patent [19]
Denton

[11] Patent Number: 5,923,681
[45] Date of Patent: Jul. 13, 1999

[54] PARALLEL SYNCHRONOUS HEADER CORRECTION MACHINE FOR ATM

[75] Inventor: Claude Denton, Madison, Ala.

[73] Assignee: Tektronix, Inc., Wilsonville, Oreg.

[21] Appl. No.: 09/028,717

[22] Filed: Feb. 24, 1998

[51] Int. Cl.[6] .......................... H03M 13/00; G01R 31/28; H04L 12/28
[52] U.S. Cl. ...................... 371/37.7; 371/20.1; 371/67.1; 370/905
[58] Field of Search .............................. 371/37.01, 37.06, 371/37.7, 37.4, 37.12, 30, 67.1, 2.1, 37.8, 20.1, 20.2, 68.1, 68.2; 370/905, 907, 395

[56] References Cited

U.S. PATENT DOCUMENTS

| | | | |
|---|---|---|---|
| 3,678,469 | 7/1972 | Freeman et al. | 340/172.5 |
| 4,105,999 | 8/1978 | Nakamura | 340/146.1 |
| 4,397,020 | 8/1983 | Howson | 370/105 |
| 4,937,828 | 6/1990 | Shih et al. | 371/37.1 |
| 5,155,487 | 10/1992 | Tanaka et al. | 341/100 |
| 5,230,002 | 7/1993 | Yamashita et al. | 371/37.1 |
| 5,251,219 | 10/1993 | Babb | 371/37.7 |
| 5,274,633 | 12/1993 | Kato et al. | 370/60 |
| 5,345,451 | 9/1994 | Uriu et al. | 371/42 |
| 5,383,203 | 1/1995 | Miyazono | 371/37.1 |
| 5,402,429 | 3/1995 | Stessens | 371/37.1 |
| 5,408,461 | 4/1995 | Urin et al. | 370/14 |
| 5,434,846 | 7/1995 | Tremel et al. | 370/13 |
| 5,485,461 | 1/1996 | Asgari | 370/94.2 |
| 5,487,061 | 1/1996 | Bray | 370/13 |
| 5,513,191 | 4/1996 | Takechi et al. | 371/37.1 |
| 5,570,377 | 10/1996 | Gonzalez et al. | 371/37.1 |
| 5,633,882 | 5/1997 | Babb et al. | 371/37.12 |
| 5,745,507 | 4/1998 | Chen | 371/37.07 |

*Primary Examiner*—Trinh L. Tu
*Attorney, Agent, or Firm*—Francis I. Gray; John C. Garvin, Jr.

[57] ABSTRACT

An error correction circuit for an ATM header of an ATM cell uses a sequence of synchronous comparator circuits to generate a correction mask. The sequence of comparators, when used in a processor having a 32-bit bus, provide for near minimum processing delay at an ATM node. The error correction circuit also provides error status flags for an ATM cell processor, allowing for the processor to discard ATM cells with multiple errors.

5 Claims, 4 Drawing Sheets

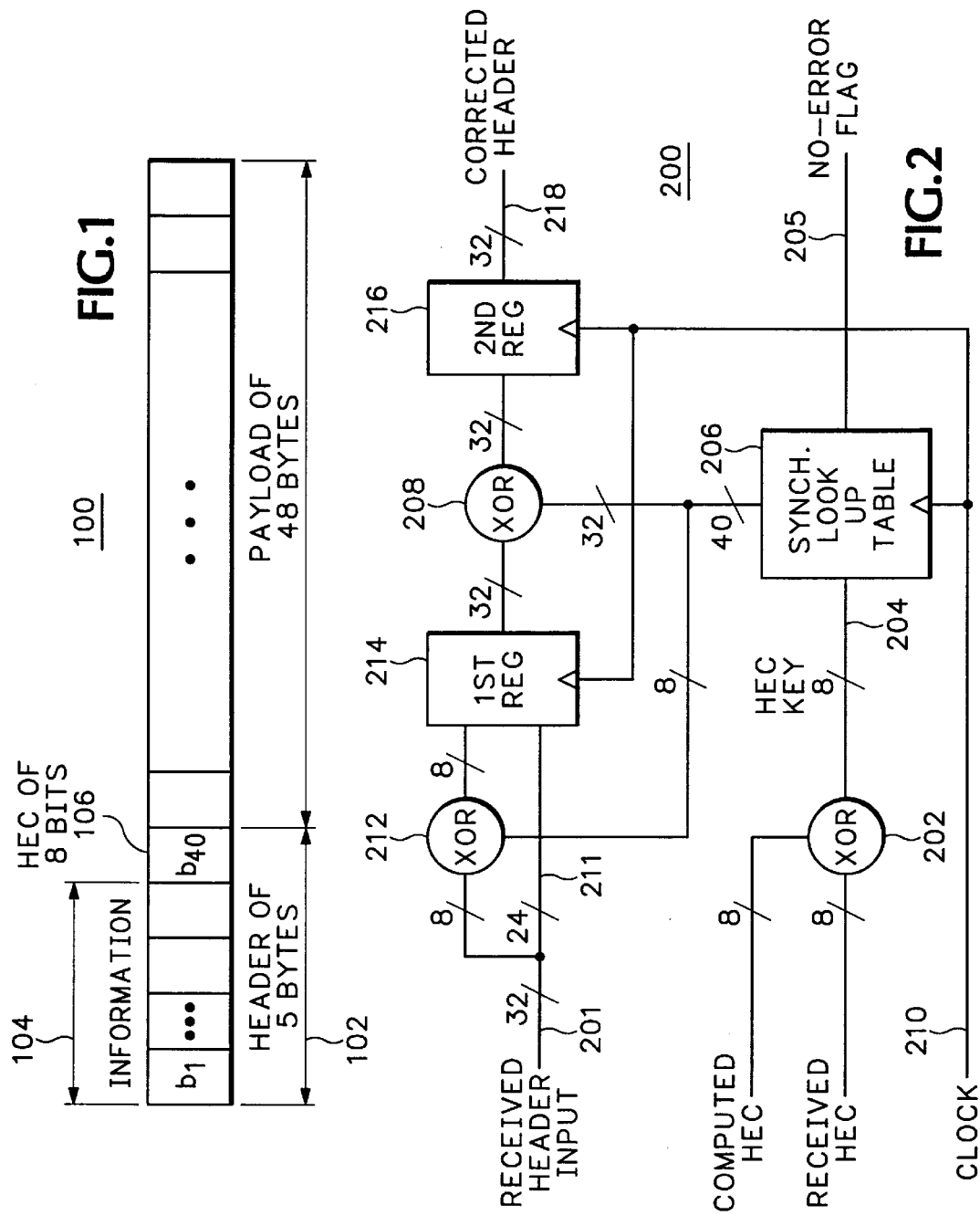

PARALLEL SYNCHRONOUS HEADER CORRECTION MACHINE FOR ATM

BACKGROUND OF THE INVENTION

The present invention relates to data communication systems, and more particularly to header error detection and correction of ATM cells where a low processing delay is required.

ATM is an asynchronous data transmission system that transports data as cells of 53-bytes. Each ATM cell has a five-byte header having four bytes of information and a header error checksum ("HEC") of one byte followed by a payload of 48 bytes of data. The payload of 48 bytes, bytes 6 to 53, is for transporting a variety of telecommunication services, such as voice service, video service, internet services and similar services. Because SONET systems are becoming available for transmitting data at rates of 2488.32 Mb/s and above, there is a need for a low delay, high throughput ATM cell processor. Details of a SONET PATH/ATM PHYSICAL LAYER TRANSMIT/RECEIVE PROCESSOR related to the present invention are described in an earlier application by the assignee having Ser. No. 08/736,074 filed by the applicant on Oct. 25, 1996. In order for ATM cell transfers to operate efficiently with a SONET based system or other high-speed transmission system it is essential to have a low ATM cell processing time at nodes of the network.

In an ATM network the payload information content processing is provided by the end users after the ATM cell has been delivered. Hence the processing parameter of concern is the time required to process the header of the ATM cell. The information bytes of the header must be error free, since the information bytes contain the routing information for the ATM cell. In order to maintain the integrity of the information bytes a one byte header error checksum ("HEC") is generated using a specified generator polynomial as contained in the ITU Recommendation, I.432. The HEC is used to determine header integrity; i.e., if no errors have occurred, if one error has occurred, or if multiple errors have occurred. Further, if one error has occurred the HEC may be used to correct the error. Cells with error-free or corrected headers may be transmitted further, cells with headers containing multiple errors are dropped.

When the transfer data rates in an ATM network were in the 155 to 800 Mb/s range, a sequential processor was capable of the throughput necessary for processing the header. As transfer speeds increase to OC-48 SONET rates and above (2.5 Gb/s and faster), an improved processing apparatus is needed. The need for a cost effective circuit having maximum throughput has resulted in a novel apparatus for providing a low delay time error correction circuit as described below.

SUMMARY OF THE INVENTION

Accordingly the present invention provides a header processing circuit for detecting and correcting errors in the header of an ATM cell. The circuit combines a received header error checksum ("HEC") with a calculated HEC using an XOR (an eXclusive OR) to generate a HEC key. The HEC key is one input to a sequence of comparators, where each of the comparators has a comparator key having a unique and predetermined value. There are 41 comparators and 41 comparator keys and no two comparator keys have the same value. At each of the comparators the HEC key and the respective comparator key are compared and a binary one ("1") is generated when a match occurs. Because each comparator key is unique only a single "1" can be generated and the output of the remaining comparators must be binary zero ("0"). One of the comparators is used to generate a no-error flag and the remaining 40 comparators generate a correction mask of 40 bits, which can be used to correct erred headers. The outputs of the comparators are also combined to generate additional flags including, a one-error flag, a one-error corrected flag, and a multiple-error flag. These output flags are used by the ATM processor in a way that meets the requirements of the ATM network provider. For example, if the multiple-error flag occurs the entire ATM cell may be discarded or if the one-error corrected flag occurs the corrected ATM cell may continue towards its final destination in the ATM network.

The present invention derives benefits from a 32-bit bus contained in a SONET path/ATM physical layer receive processor described in the above mentioned application. The 32-bit bus provides for processing of bit streams with throughput 2 and 4 times greater than on 16-bit and 8-bit busses. In addition the comparators are operating in parallel and synchronously to generate the error mask and can process a header every two cycles of the ATM processor. The error mask is then XOR'd with the received header, producing corrected headers with the maximum throughput possible with 32-bit processing.

The objects, advantages and novel features of the present invention are apparent from the following detailed description when read in conjunction with the appended claims and attached drawings.

BRIEF DESCRIPTION OF THE DRAWINGS

FIG. 1 illustrates the structure for an ATM cell.

FIG. 2 is a block diagram illustrating elements of an embodiment of the present invention.

DESCRIPTION OF THE PREFERRED EMBODIMENT

Figure 3:
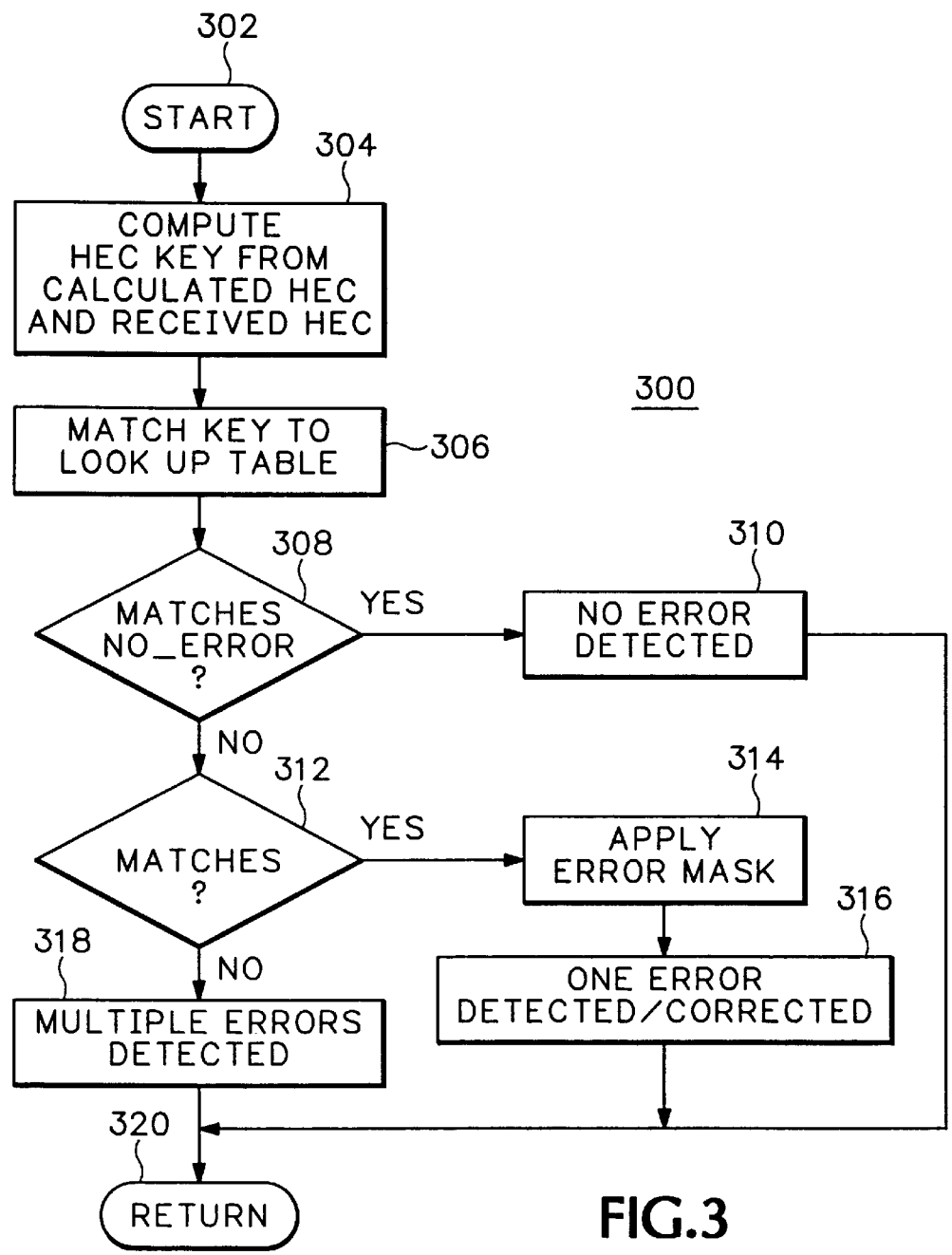
FIG. 3 is a flow chart illustrating a method for correcting and detecting errors in the header of an ATM cell in accordance with the present invention.

Referring now to FIG. 1 there is shown an ATM cell 100 of 53 bytes having five bytes for a header 102 and 48 bytes for a payload as defined in ATM specifications. The 40 bits in the header are labeled from left to right with the first bit labeled $b_1$ and the last bit labeled $b_{40}$. When the ATM cell is transferred from a first node to a second node via a transmission media, impairments in the transmission media may cause errors to be received at the second node. Because the header information contains path information, i.e., where the ATM cell is going, it is necessary that header errors be detected and corrected. The first four bytes 104 of the header contain path information and the fifth byte 106 is a header error checksum ("HEC"). The HEC is generated according to ATM specifications using a CRC generator polynomial, $x^8+x^2+x+1$. A transmitted header of a transmitted ATM cell at a first node therefore contains the four path information bytes and transmitted HEC. When the transmitted ATM cell, containing the transmitted header, is received at a second node as a received ATM cell, the received header contains received path information and a received HEC. Because of transmission impairments the transmitted ATM header may not equal the received ATM header. Generating the HEC byte at the first node in accordance with ATM specifics provides a procedure, known to those skilled in the art, for error detection and correction. The procedure provides for correcting one error in the received header, determining if no errors exist, and detecting multiple errors. An apparatus for applying the procedure of detection and correction is designer dependent. Typically those skilled in art use a high-speed sequential processor having operations for correcting and detecting errors. Typically in performing these operations a no-error flag, a one-error corrected flag, and a multiple-error flag would be generated.

FIG. 2 is a block diagram 200 illustrating an error correction circuit for detecting and correcting errors in accordance with the present invention. A computed HEC is generated using the first four bytes of the received header using a high-speed parallel checksum generator. The computed HEC of 1 byte is XOR'd with the received HEC by a HEC XOR 202 thereby generating a HEC key 204. The HEC key is simultaneously compared with 41 comparator keys in a synchronous look-up table 206, where each comparator key is unique, thereby generating a correction mask of 40 bits and a no-error flag 205. The correction mask is an arrangement of "0's" and no more than one "1" since the output of each of the comparators is "0" unless the HEC key matches one of the unique comparator keys. The no-error flag is set to "1" if the HEC key is hex "00" and is set to "0" when the HEC key is not hex "00".

Figure 5:
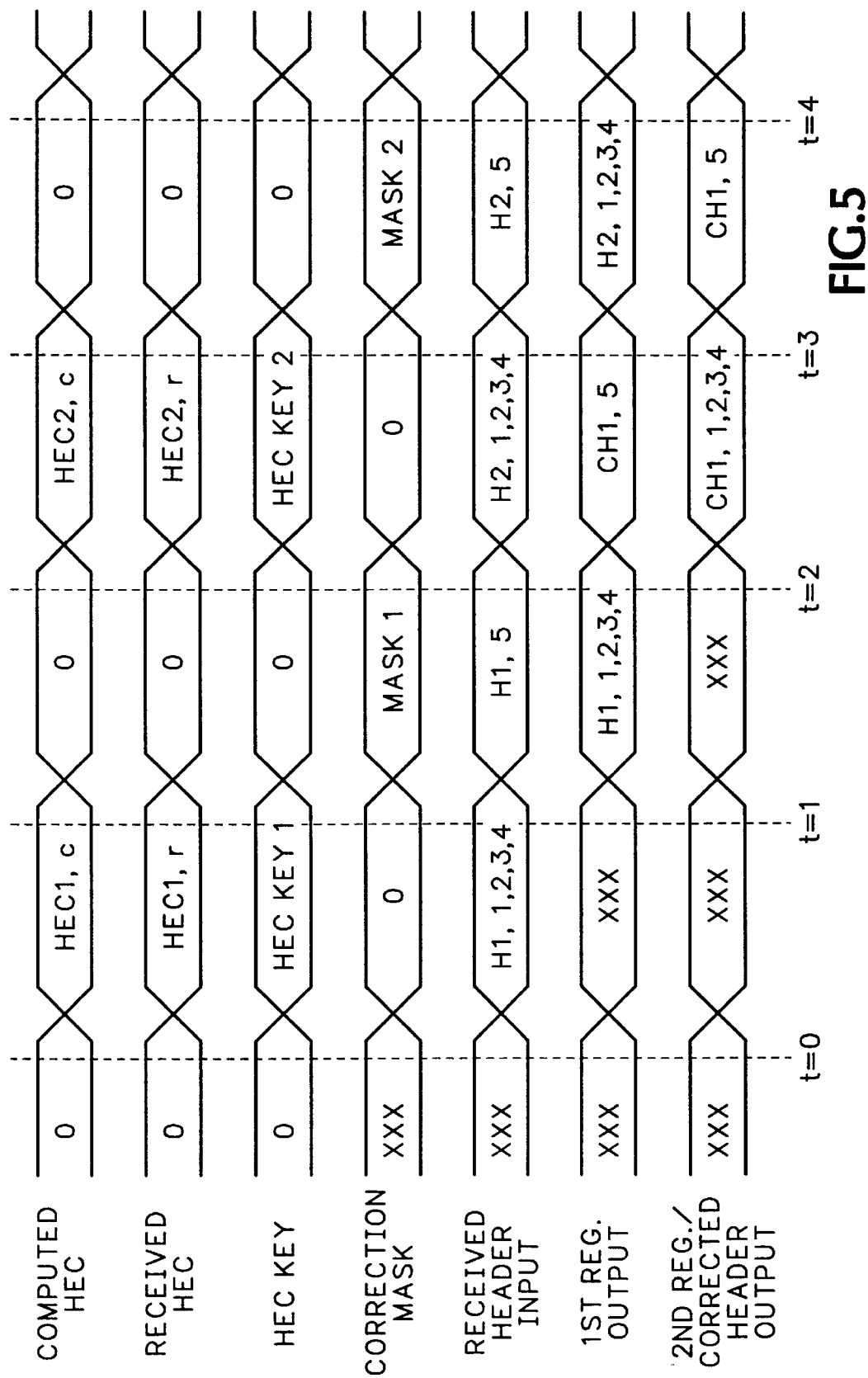
FIG. 5 is a timing diagram illustrating the occurrence of events in an embodiment of the present invention.

In the present invention as illustrated in FIG. 2, when the correction mask is set equal to "0" and remains unchanged, data on the input 32-bit bus is transferred to a first register 214, a second register 216 and an output 32-bit bus unchanged. However two clock cycles of clock 210 are required for data to pass through the error correction circuit 200. A timing diagram illustrating the operation of the error correction circuit is shown in FIG. 5. At a reference time, t=0, a first transition of clock 210, the first 4 bytes of the header become a received header input 201. The correction mask is set to a value of "0" at t=0. Also at t=0 the computed HEC and the received HEC are combined by HEC XOR 202 to obtain the HEC Key 204. Next when a second clock transition occurs, t=1, the first four bytes of the header are transferred to the first register 214 and a second 4 bytes of data arrive at the received header input 201. The first byte of the second 4 bytes is the fifth header byte. The synchronous look-up table 206 at t=1 latches the HEC Key 204 and begins to generate values for the correction mask. The received HEC and the computed HEC are again set to "0". When the third clock transition occurs, t=2, the correction mask is applied. One byte of the correction mask is coupled to byte XOR 210 and the remaining 4 bytes of the correction mask are coupled to 4 byte XOR 208. The byte XOR 210 and the 4 byte XOR 208 serve as a mask XOR for correcting a single error or allowing a zero error header to pass unchanged. The first four bytes of the header are corrected by XOR 208 and latched into the second register 216, and the fifth byte of header is corrected by XOR 210 and latched into the first register 214. Thus just after the clock edge at t=2 the first four bytes of corrected header are available on the corrected header output 218. The synchronous look-up table begins to generate a mask of '0' because of the key applied in the last cycle. At t=3 the correction mask is 0 and the contents of the first register pass unchanged to the second register. Thus just after the clock edge at t=3 the fifth byte of corrected header is available on the corrected header output 218. If no errors occur, the correction mask at t=2 has all its 40 bits set to "0" and the no-error flag 205 is "1". If two errors have occurred then the 40-bit mask also has all bits set equal to "0", but in the case of two errors the output of the no-error flag is "0". The parallel processing as described above and illustrated in FIG. 2 and FIG. 5 occurs at the full data rate, imposing no reduction in header throughput. FIG. 5 also shows fully pipelined operation, where a second header enters the machine at t=2.

Referring now to FIG. 3 there is a flow chart 300 illustrating a method of error correction and detection in accordance with the present invention. The method of the flow chart starts, step 302, when a received header requires processing. After a calculated HEC is generated by a high-speed CRC generator, a HEC key is generated by XORing the calculated HEC with the received HEC, step 304. Next the HEC key is synchronously compared with 40 comparator keys to determine if any matches occur, step 306. If no matches occur and the HEC key is equal to hex "00" then there are no errors and a no-error flag is set to "1", step 310. If one match occurs, the YES path of step 312, a correction mask is generated comprising "0's" and a "1", step 314. If no match occurs, the NO path of step 312, then multiple-errors have occurred and a multiple-error flag is set to "1", step 318. Upon completion of the steps 304 through 318 a return step 320 places the method back to start step 302. The steps as described in FIG. 3 occur simultaneously and synchronously in a novel arrangement of logic circuit elements. One such arrangement of logic elements is shown in FIG. 4.

Figure 4:
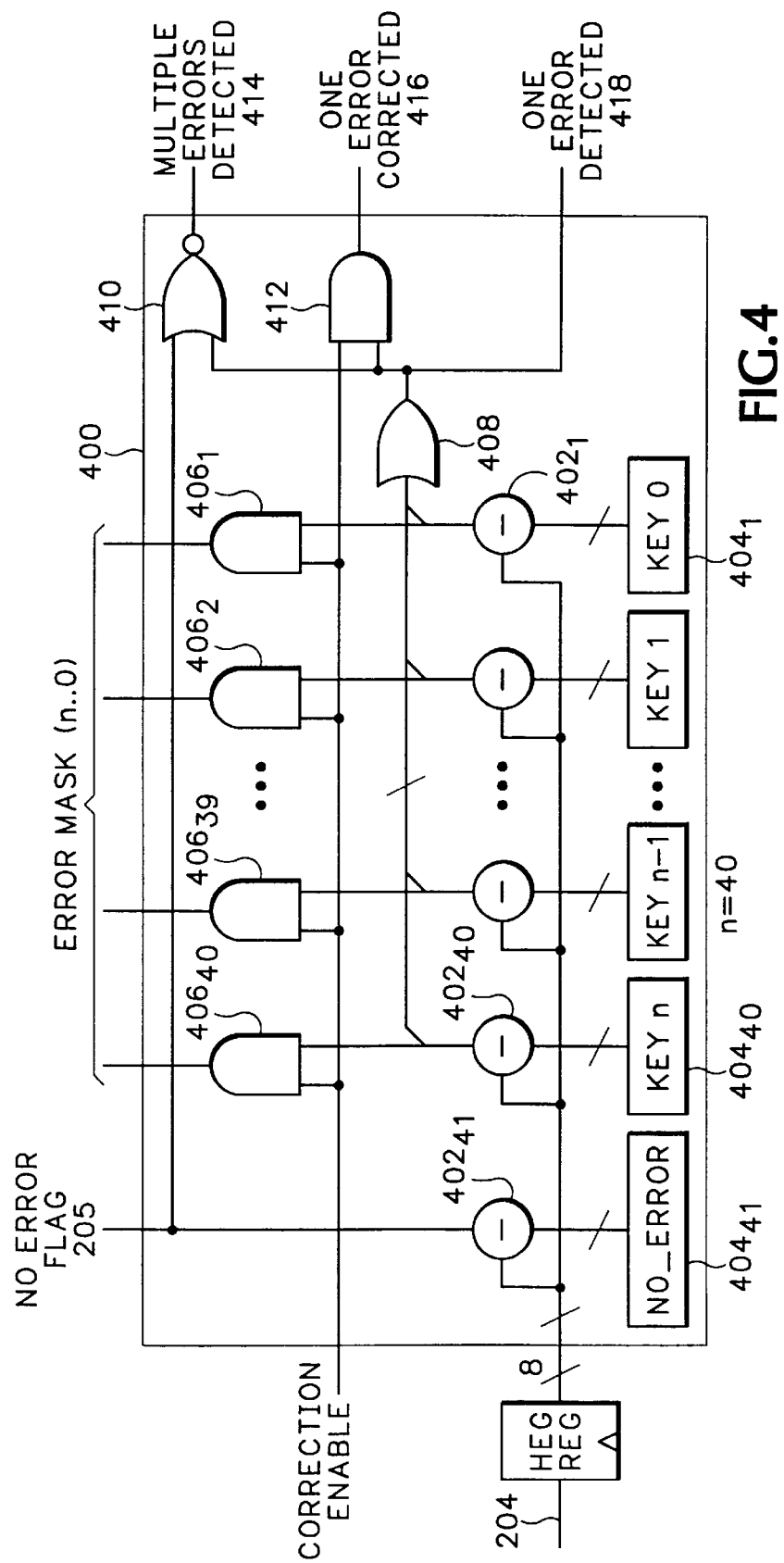
FIG. 4 illustrates the circuit elements for an embodiment of the present invention.

FIG. 4 illustrates a synchronous look-up table 400 having logic elements that create an error correction mask in accordance with the present invention. The HEC key 204 on an 8-bit bus is simultaneously compared with 41 comparator keys $404_{41}$ to $404_1$ by comparators $402_{41}$ to $402_1$. The HEC key of 8 bits may have up to 256 values, but each of the comparator keys of 8 bits has a unique and predetermined value. A comparator of the 41 comparators has an output of "1" when the HEC key matches the comparator's comparator key. Because no two comparator keys have the same value only one of the comparators may have an output of "1". The output of comparators $402_{40}$ to $402_1$ are arranged sequentially to form a correction mask of 40 bits. Comparator $402_{41}$ generates the no-error flag, which has a value of "1" when the HEC key has a value of hex "00". The value for the comparator key $402_i$ is the syndrome of the generator polynomial when all the bits of the first four bytes of the header are "0" except for location "i" which is equal to "1". For example, the comparator key for the 40th comparator, $402_{40}$, is hex "01" and for the 1st comparator, $402_1$, is hex "31". Each of the comparator keys is unique and may be determined as described above or in a variety of ways by those skilled in the art. The correction mask of 40 bits is formed when the output of the comparators passes through AND gates $406_{40}$ to $406_1$. The correction mask is then applied to the received header using 4 byte XOR 208 and byte XOR 210 to correct any 1-bit error in the header.

In addition to providing the error correction mask, the synchronous look-up table 400 generates status flags such as the no-error flag 205. When the outputs of the 40 comparators are combined using OR gate 408 and then are combined with the correction enable signal in error corrected AND gate 412 a one-error corrected flag is set to "1". The output of the OR gate 408 is a one-error detected flag. When multiple errors occur, the output of the 41st comparator $402_{41}$ is "0" and the output of the OR gate 408 is "0", when these two outputs are combined in NOR gate 410 a multiple-error flag is set equal to "1". Each of the status flags is used by the ATM processor, not shown, to take actions in accordance with the requirements of the ATM network. Typically an ATM cell is discarded if multiple errors occur. If one error is corrected or no errors occur then the ATM cell is directed according to the path information in the cell's header.

The synchronous look-up table 400 illustrated in FIG. 4, functions in a pipelined fashion and has the ability to perform header error correction/detection functions on a continuous stream of ATM headers at 2.2 Gb/s. Prior art sequential correction systems typically process one header per cell time in a non-pipelined fashion, and would be difficult to scale to higher data rates.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims:

What is claimed is:

1. An error correction circuit with pipeline capability for correcting one header error in a received header of an ATM cell, the circuit comprising:

a HEC XOR gate for combining a computed HEC and a received HEC where the output of the HEC XOR gate is a HEC key;

a parallel arrangement of 40 comparators with each comparator having a unique comparator key, the comparators simultaneously and synchronously comparing the HEC key with each unique comparator key, thereby generating a correction mask as a concatenation of the comparator outputs; and a mask XOR gate for combining the correction mask with the received header, where the output of the mask XOR gate is a corrected ATM header.

2. The error correction circuit of claim 1 wherein an additional comparator is coupled to the output of the HEC XOR gate and provides a no-error flag with a value equal to "1" when the HEC key has a hex value of "0".

3. The error correction circuit of claim 2 wherein a means for generating a multiple-error flag is coupled to the outputs of the comparators and the additional comparator.

4. The error correction circuit of claim 1 wherein a data rate for the ATM cell is greater than 800 Mb/s.

5. The error correction circuit of claim 1 wherein the ATM cell is transported on a SONET optical carrier having a speed equal to or greater than an OC-24 data rate.

* * * * *

UNITED STATES PATENT AND TRADEMARK OFFICE
CERTIFICATE OF CORRECTION

PATENT NO : 5,923,681
DATED : July 13, 1999
INVENTOR(S) : Claude Denton It is certified that error appears in the above-identified patent and that said Letters Patent is hereby corrected as shown below:

Column 1, after line 2 insert the following:

"STATEMENT REGARDING FEDERALLY SPONSORED RESEARCH OR DEVELOPMENT

This invention was made with Government support under Agreement No. N00014-94-C-2168 awarded by Department of Navy. The Government has certain rights in the invention."

Signed and Sealed this

Twenty-seventh Day of March, 2001

*Attest:*

NICHOLAS P. GODICI

*Attesting Officer*  *Acting Director of the United States Patent and Trademark Office*